(12) United States Patent
DeFord et al.

(10) Patent No.: US 8,276,186 B2
(45) Date of Patent: Sep. 25, 2012

(54) SYSTEM AND METHOD FOR SYNCHRONIZING SECURITY SETTINGS OF CONTROL SYSTEMS

(75) Inventors: Leslie Lee DeFord, Phoenix, AZ (US); Steven Roby, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 950 days.

(21) Appl. No.: 12/017,583

(22) Filed: Jan. 22, 2008

(65) Prior Publication Data

US 2009/0187969 A1 Jul. 23, 2009

(51) Int. Cl.
G06F 17/30 (2006.01)
(52) U.S. Cl. ............... 726/2; 726/4; 726/27; 726/28; 726/29; 713/182; 713/100
(58) Field of Classification Search ............... None
See application file for complete search history.

(56) References Cited

U.S. PATENT DOCUMENTS

| | | | |
|---|---|---|---|
| 5,734,380 A | 3/1998 | Adams et al. | |
| 5,796,403 A | 8/1998 | Adams et al. | |
| 7,065,644 B2 * | 6/2006 | Daniell et al. | 713/166 |
| 7,111,321 B1 * | 9/2006 | Watts et al. | 726/2 |
| 7,194,637 B1 * | 3/2007 | Crawford | 713/153 |
| 7,237,109 B2 * | 6/2007 | Scott et al. | 713/164 |
| 7,317,699 B2 * | 1/2008 | Godfrey et al. | 370/328 |
| 7,467,018 B1 * | 12/2008 | Callaghan | 700/1 |
| 2003/0061482 A1 * | 3/2003 | Emmerichs | 713/165 |
| 2003/0172371 A1 * | 9/2003 | Offenmuller | 717/120 |
| 2004/0148513 A1 * | 7/2004 | Scott et al. | 713/200 |
| 2004/0153171 A1 * | 8/2004 | Brandt et al. | 700/9 |
| 2004/0186998 A1 * | 9/2004 | Kim et al. | 713/169 |
| 2005/0002354 A1 * | 1/2005 | Kelly et al. | 370/329 |
| 2005/0015674 A1 * | 1/2005 | Haugh | 714/38 |
| 2005/0262132 A1 * | 11/2005 | Morita et al. | 707/102 |
| 2006/0062426 A1 * | 3/2006 | Levy et al. | 382/100 |
| 2006/0085839 A1 * | 4/2006 | Brandt et al. | 726/2 |

(Continued)

FOREIGN PATENT DOCUMENTS

EP 1612630 * 1/2006

OTHER PUBLICATIONS

Bertino et al., "A System to Specify and Manage Multipolicy Access Control Models," IEEE, 2002, pp. 1-11.*

(Continued)

*Primary Examiner* — Luu Pham
(74) *Attorney, Agent, or Firm* — Jetter & Associates, P.A.

(57) ABSTRACT

A method for communicating data between a first and second control system (FCS and SCS). FCS (202) controls a first process (FP) having first security data (FSD) in a first data security format (FDSF). The method involves modifying the FSD (214) from being in the FDSF into modified security data (MSD) in a modified security format (MSDF) compatible with SCS (226). Subsequent to the modifying, a request is received from an SCS user. The request includes a user type, process parameter (PP) associated with the FP, and request for information regarding the PP or a request to change a PP value. The method also involves referencing the user type and PP to the MSD. The method further involves blocking or allowing the request based on results of the referencing. If results indicate that the request is allowed, then an access level can be impersonated for changing the PP value in FCS.

13 Claims, 6 Drawing Sheets

U.S. PATENT DOCUMENTS

| | | | | |
|---|---|---|---|---|
| 2007/0067458 A1* | 3/2007 | Chand | | 709/226 |
| 2007/0153814 A1* | 7/2007 | Canning et al. | | 370/401 |
| 2007/0155423 A1 | 7/2007 | Carmody et al. | | |
| 2007/0192823 A1* | 8/2007 | Andersen et al. | | 726/1 |
| 2008/0066159 A1* | 3/2008 | Dillaway et al. | | 726/4 |
| 2008/0086633 A1* | 4/2008 | Anderson et al. | | 713/156 |
| 2008/0091682 A1* | 4/2008 | Lim | | 707/9 |
| 2008/0140433 A1* | 6/2008 | Levy et al. | | 705/1 |
| 2009/0100423 A1* | 4/2009 | Doyle et al. | | 718/1 |

OTHER PUBLICATIONS

Bharadwaj et al., "Towards Automated Negotiation of Access Control Policies," IEEE, 2003, pp. 1-9.*

Hauf et al., "Role-based Security for Configurable Distributed Control Systems," IEEE, 2001, pp. 111-118.*

Jeong et al., "A Flexible Database Security System using Multiple Access Control Policies," IEEE, 2003, pp. 236-241.*

* cited by examiner

US 8,276,186 B2

SYSTEM AND METHOD FOR SYNCHRONIZING SECURITY SETTINGS OF CONTROL SYSTEMS

FIELD OF THE INVENTION

The invention concerns control systems and methods for synchronizing customized security settings of control systems.

BACKGROUND

There are many types of industrial plant control systems (IPCS) known in the art for controlling industrial equipment and processes. One such conventional IPCS 102 is shown in FIG. 1. The IPCS 102 can have a distributed network configuration, i.e., there are application specific modules connected to each other, industrial equipment, and user interfaces via a local control network. As shown in FIG. 1, the IPCS 102 generally includes a computing system 104 and a memory device 106. The computing system 104 is typically a desktop personal computer system, a laptop personal computer system, a personal digital assistant, a wireless computing device, or any other general purpose computer processing device. The computing system 104 is configured to allow users to monitor and/or control an industrial process or equipment 118. More particularly, the computing system 104 is configured to (a) enable a user to customize security settings for various employee types (e.g., program level (PROG), engineer level (ENGR), supervisor level (SUPR), and operator level (OPER)) of an industrial plant, (b) enable a user (e.g., an engineer or operator) to obtain information regarding one or more parameters of an industrial process based on the customized security settings, and (c) enable a user (e.g., an engineer or operator) to change one or more parameters of an industrial process based on the customized security settings. Such parameters generally include, but are not limited to, temperature parameters, timing parameters, and liquid level parameters.

The memory device 106 is configured to retain a default security setting data file (DSSDF) 108 containing default security setting data 110 and a customized security setting data file (CSSDF) 112 containing customized security setting data (CSSD) 114. Such security setting data 110, 114 can generally include information indicating a user type (or access level) and information indicating process parameters (e.g., temperature and liquid level) that a particular type of user can change. The user types (or access levels) can generally include, but are not limited to, a program user type (or access level), an engineer user type (or access level), a supervisor user type (or access level), and an operator user type (or access level)). For example, the CSSDF 112 includes data $PP_{11}$—E O indicating that a user logged into the IPCS 102 having an operator status can change a process parameter $PP_{35}$. The phrase "log in" as used herein refers to a process of identifying a user to the IPCS 102 for gaining access to the IPCS 102 as a legitimate user.

As shown in FIG. 1, if a user having an operator status initiates actions using the computing system 104 associated with changing the value of the process parameter $PP_{35}$, then the computing system 104 can perform actions to access the memory device 106, retrieve CSSD 114 therefrom, and determine whether the process parameter $PP_{35}$ change is allowed based on the CSSD 114. If it is determined that the user having an operator status is authorized to change the process parameter $PP_{35}$, then the computing system 104 allows the requested action to be completed, such as writing a new value to the memory device 106. Alternatively, if it is determined that the user having an operator status is not authorized to change the process parameter $PP_{35}$, then the computing system 104 can perform actions to display a message to the user indicating that the process parameter $PP_{35}$ change was not allowed (or blocked).

One can appreciate that there are certain advantages to connecting a second IPCS 122 to the first IPCS 102. For example, IPCSs are expensive and complex to install. The installation generally includes electronically connecting numerous circuits together. Each of the circuits and associated connections often need to be tested and certified by one or more government agencies. As such, users of an IPCS 102 are often unwilling to replace the IPCS 102 with an upgraded version of the control system. Instead, users may want to build on top of or expand the capabilities of an existing IPCS 102 by adding additional software and/or hardware to the IPCS 102. Such software and/or hardware can include a second IPCS 122.

However, a control system configuration including two or more IPCSs (such as IPCSs 102, 122) generally suffers from certain drawbacks. For example, the first IPCS 102 and the second IPCS 122 may not be compatible with one another, i.e., each IPCS 102, 122 may employ a different communications format. As such, a gateway node 120 may be provided to enable the communications between the first IPCS 102 and the second IPCS 122. Consequently, the control system configuration becomes more hardware intensive. Furthermore, the second IPCS 122 generally does not utilize the customized security settings of the first IPCS 102 for allowing or blocking a user from manipulating process parameters. Rather, the second IPCS 122 user may instead be forced to utilize the default security settings of the first IPCS 102 for allowing or blocking the user from manipulating process parameters stored in its associated memory device 106. One can appreciate that this may be a disadvantage when a user (e.g., an engineer) of another computer system (e.g., IPCS 122) can not change a certain process parameter during emergency situations associated with the first IPCS 102 (that would be able to be changed by users of the first IPCS 102). Thus, there is a need for an improved system and methodology for coordinating security settings between two or more control systems.

SUMMARY OF THE INVENTION

This Summary is provided to comply with 37 C.F.R. §1.73, requiring a summary of the invention briefly indicating the nature and substance of the invention. It is submitted with the understanding that it will not be used to interpret or limit the scope or meaning of the claims.

The present invention concerns systems and methods for communicating data between a first control system and a second control system. The first control system is operable for controlling a first process having first security data in a first data security format. The first security data is provided for limiting access to a computing system, such as a computing system associated with a process (e.g., an industrial process). The method generally involves modifying the first security data from being in the first data security format into modified security data in a modified security format. The modified security format is compatible with the second control system. Subsequent to modifying the first security data, a request is received from a user (e.g., engineer or operator) of the second control system. The request can include a user type (or access level) and at least one process parameter associated with the first process. The request can also include a request for information regarding the process parameter or a request to change a value of the process parameter. The method can also involve referencing the user type and the process parameter to the modified security data. The method can further involve blocking or allowing the request based on results of the referencing step.

BRIEF DESCRIPTION OF THE DRAWINGS

Embodiments will be described with reference to the following drawing figures, in which like numerals represent like items throughout the figures, and in which.

DETAILED DESCRIPTION

The invention concerns methods and related implementing systems for synchronizing (or coordinating) custom security settings of a first and second computing (or control) system. The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Before describing method embodiments of the present invention, it will be helpful in understanding an exemplary environment in which the invention can be utilized. In this regard, it should be understood that the methods of the present invention can be utilized in any application where a first computing system having customized security settings is coupled to a second computing system absent of customized security setting functions. Such applications include, but are not limited to, industrial plant control applications, security applications, and customized network applications. Accordingly, the methods of the present invention will now be described in relation to one such application, namely, the industrial plant control application.

Figure 1:
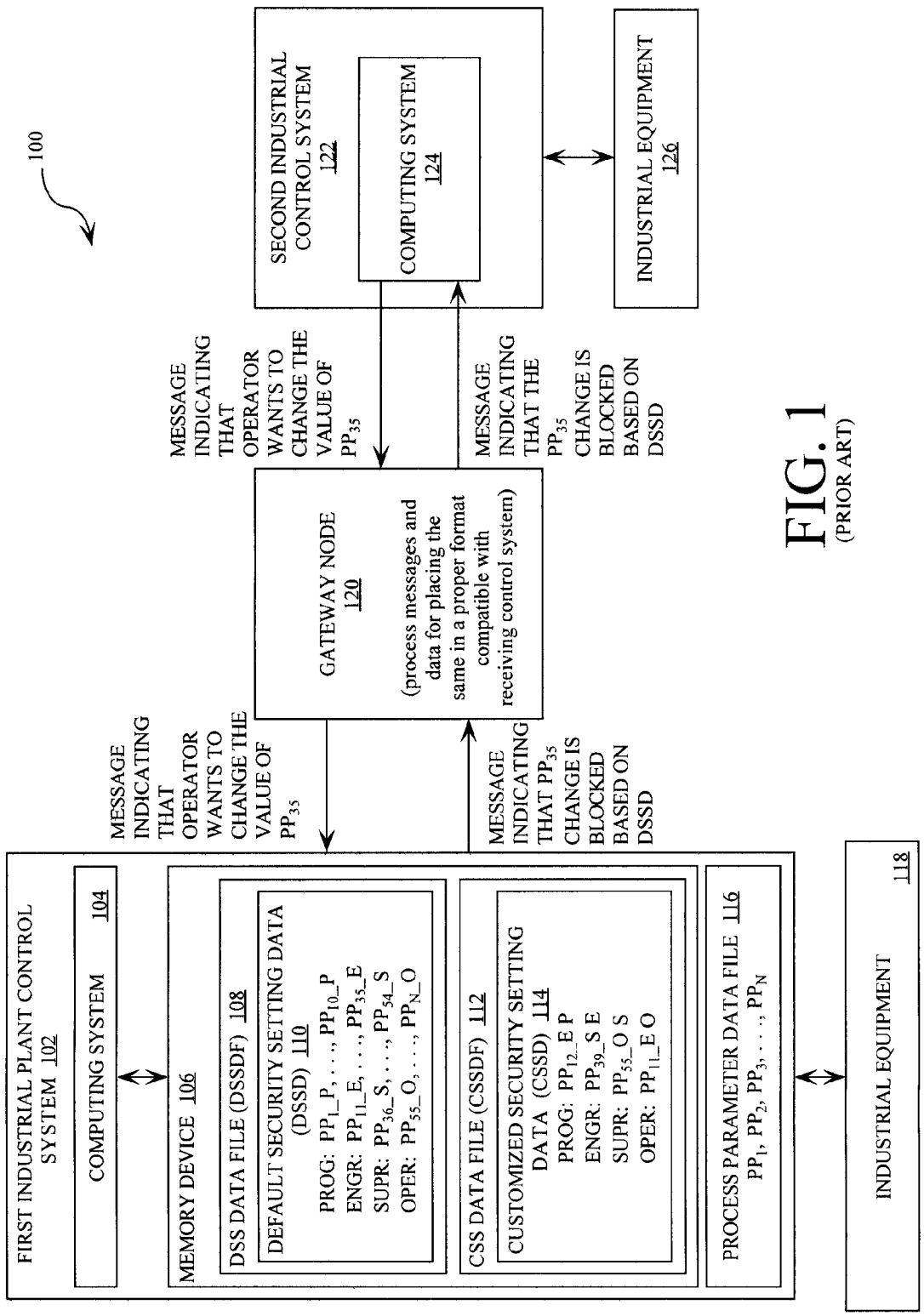
FIG. 1 is a block diagram of a conventional industrial plant control system.
Figure 2:
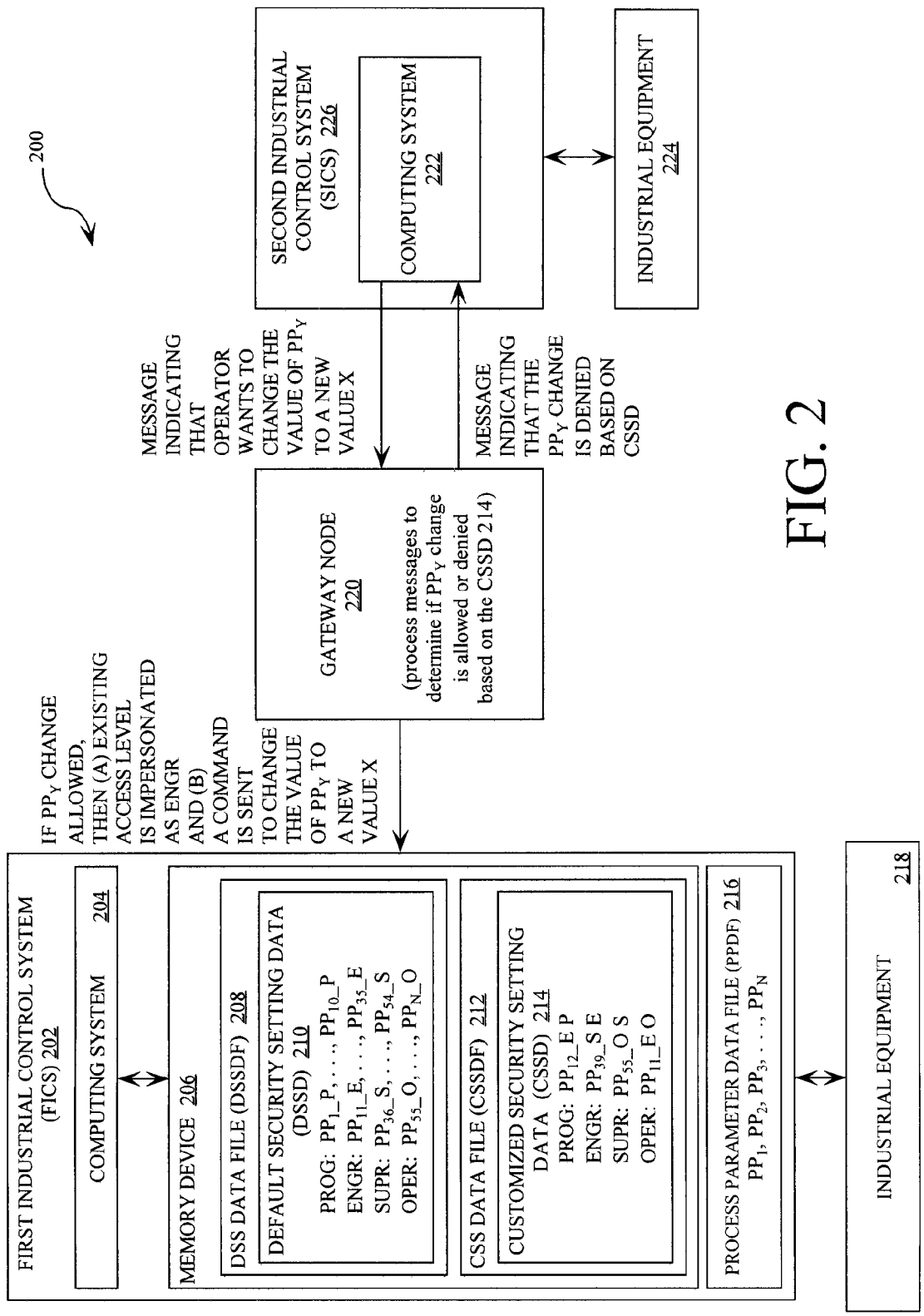
FIG. 2 is a block diagram of an industrial plant control system having a gateway node according to an embodiment of the invention.

Referring now to FIG. 2, there is provided a block diagram of an industrial plant control system 200 according to an embodiment of the invention. As shown in FIG. 2, the control system 200 is comprised of a first industrial control system (FICS) 202, a gateway node 220, a second industrial control system (SICS) 226, and industrial equipment 218, 224. The FICS 202 and SICS 226 are configured to enable a user (e.g., an engineer or an operator) to monitor and/or control processes run by respective industrial equipment 218, 224. In one non-limiting application, the FICS 202 and/or SICS 226 can be the control system described in U.S. Pat. No. 5,796,403 and U.S. Pat. No. 5,734,380. In such a scenario, the FICS 202 and/or SICS 226 are generally distributed control systems, i.e., there are application specific modules (not shown) connected to each other, industrial equipment, and user interfaces (not shown) via a local control network (not shown). The industrial equipment 218, 224 may include, but is not limited to, gauges, valves, transmitters, actuators, and sensors. The invention is not limited in this regard.

In another non-limiting application, the FICS 202 can implement a communication standard based on a token ring method described in an Institute of Electrical and Electronics Engineers (IEEE) 802.5 standard. Implementation of the token ring based communication standard enables communications between the application specific modules (not shown), industrial equipment 218, and user interfaces (not shown). Token ring based communication standards are well known to those having ordinary skill in the art, and therefore will not be described herein. The invention is not limited in this regard. The FICS 202 can employ any communications format selected in accordance with a particular control system application.

The FICS 202 is comprised of a computing system 204 and a memory device 206. The computing system 204 may be a desktop personal computer system, a laptop personal computer system, a personal digital assistant, a mobile computing device, or any other general purpose computer processing device. Accordingly, the computing system 204 is comprised of a user interface (not shown) including input devices, output devices, and software routines configured to allow a user to interact with and control software applications installed on the computing system 204. Such input and output devices include, but are not limited to, a display screen (not shown), a speaker (not shown), a keypad (not shown), a directional pad (not shown), a directional knob (not shown), a hardware keyswitch (not shown), and a microphone (not shown). As such, the computing system 204 can facilitate a user-software interaction for communicating with the memory device 206. The computing system 204 can also facilitate a user-software interaction for customizing security settings of the FICS 202, modifying customized security settings of a customized security setting data file (CSSDF) 212 (described below), and changing process parameters $PP_1, PP_2, \ldots, PP_N$ stored in the memory device 206. The process parameters can generally include, but are not limited to, a temperature parameter, a timing parameter, and a liquid level parameter.

As shown in FIG. 2, the memory device 206 can have a default security setting data file (DSSDF) 208, a customized security setting data file (CSSDF) 212, and a process parameter data file (PPDF) 216 stored therein. The PPDF 216 is comprised of process parameter data $PP_1, PP_2, \ldots, PP_N$. The process parameter data $PP_1, PP_2, \ldots, PP_N$ can identify pre-defined values for process parameters. Each of the process parameters $PP_1, PP_2, \ldots, PP_N$ is generally mutually exclusive, i.e., only one user type (or access level) is generally allowed to change (or manipulate) each of the process parameters $PP_1, PP_2, \ldots, PP_N$, respectively.

The DSSDF 208 is comprised of default security setting data (DSSD) 210. The DSSD 210 generally includes, but is not limited to, information identifying user types (or access levels) and process parameters that a particular user type (or access level) is allowed to change. For example, the DSSD 210 includes information indicating the user types (or access levels) of program (PROG), engineer (ENGR), supervisor (SUPR), and operator (OPER). The DSSD 210 can also include information indicating that an engineer ENGR is allowed to change values for the process parameters $PP_{11}, \ldots, PP_{35}$. This information is expressed in FIG. 2 as $PP_{11}\_E \ldots, PP_{35}\_E$. Similarly, the DSSD 210 can include information indicating that an operator OPER is allowed to change the process parameters $PP_{55}$ through $PP_N$, and so on. The invention is not limited in this regard.

According to one embodiment of the invention, the DSSD 210 includes all of the process parameters $PP_1, \ldots, PP_N$ required to perform a particular industrial process and to control the industrial equipment 218. The DSSD 210 is not allowed to be edited by users of the FICS 202. Stated differently, a user of the FICS 202 can not edit the data of the DSSD 210 so as to change the default security settings. Also, the access level of program (PROG) provides a lock-out feature to the FICS 202. The phrase "lock-out feature" as used herein refers to a feature preventing all human user types of FICS 202 users (e.g., engineer, supervisor, and operator) from changing the values of certain process parameters (e.g., $PP_1, \ldots, P_{10}$). Still, the invention is not limited in this regard.

Referring again to FIG. 2, the CSSDF 212 is comprised of customized security setting data (CSSD) 214. The CSSD 214 can generally include information identifying an access level of program (PROG) that provides a lock-out feature to the FICS 202. For example, the CSSD 214 can include information indicating that a value of a process parameter $PP_{12}$ is not allowed to be changed by an engineer, supervisor, and operator. Still, the invention is not limited in this regard.

The CSSD 214 can also generally include, but is not limited to, information identifying user types (or access levels) and process parameters that a particular user type (or access level) is allowed to change. For example, the CSSD 214 can include information indicating the user types (or access levels) of engineer (ENGR), supervisor (SUPR), and operator (OPER). The CSSD 214 can also include information indicating that an engineer level employee ENGR is allowed to change the value of a process parameter $PP_{39}$. This information is expressed in FIG. 2 as $PP_{39}\_S\ E$. Likewise, the CSSD 214 includes information indicating that a supervisor level employee SUPR is allowed to change the value of a process parameter $PP_{55}$. This information is expressed in FIG. 2 as $PP_{55}\_O\ S$. Similarly, the CSSD 214 includes information indicating that an operator level employee OPER is allowed to change the value of a process parameter $PP_{11}$. This information is expressed in FIG. 2 as $PP_{11}\_E\ O$. The invention is not limited in this regard.

The gateway node 220 is configured to enable communications between the FICS 202 and SICS 226. The gateway node 220 is also configured to perform methods for synchronizing (or coordinating) the custom security settings of the FICS 202 and SICS 226. The gateway node 220 will be described in more detail below in relation to FIG. 3. Similarly, the methods for synchronizing (or coordinating) custom security settings will be described in more detail below in relation to FIG. 5.

Referring again to FIG. 2, the SICS 226 is comprised of a computing system 222. The computing system 222 may be a desktop personal computer system, a laptop personal computer system, a personal digital assistant, a mobile computing device, or any other general purpose computer processing device. Accordingly, the computing system 222 is comprised of a user interface (not shown) including input devices, output devices, and software routines configured to allow a user to interact with and control software applications installed on the computing system 222. Such input and output devices include, but are not limited to, a display screen (not shown), a speaker (not shown), a keypad (not shown), a directional pad (not shown), a directional knob (not shown), a hardware keyswitch (not shown), and a microphone (not shown). As such, the computing system 222 can facilitate a user-software interaction for communicating with the gateway node 220 and the FICS 202. The computing system 222 can also facilitate a user-software interaction for (a) requesting information for a process parameter $PP_1, PP_2, \ldots, PP_N$, (b) requesting a process parameter change, and (c) changing (or manipulating) the process parameter $PP_1, PP_2, \ldots, PP_N$ stored in the memory device 206 of the FICS 202.

In one non-limiting application, the SICS 226 can implement a communications standard based on Object Linking and Embedding (OLE) for process control (OPC). Implementation of the OPC based communications standard enables communications between the application specific modules (not shown), industrial equipment 224, and user interfaces (not shown). OLE and OPC are well known to those having ordinary skill in the art, and therefore will not be described herein. The invention is not limited in this regard. The SICS 226 can generally employ any communications format selected in accordance with a particular control system application.

Figure 3:
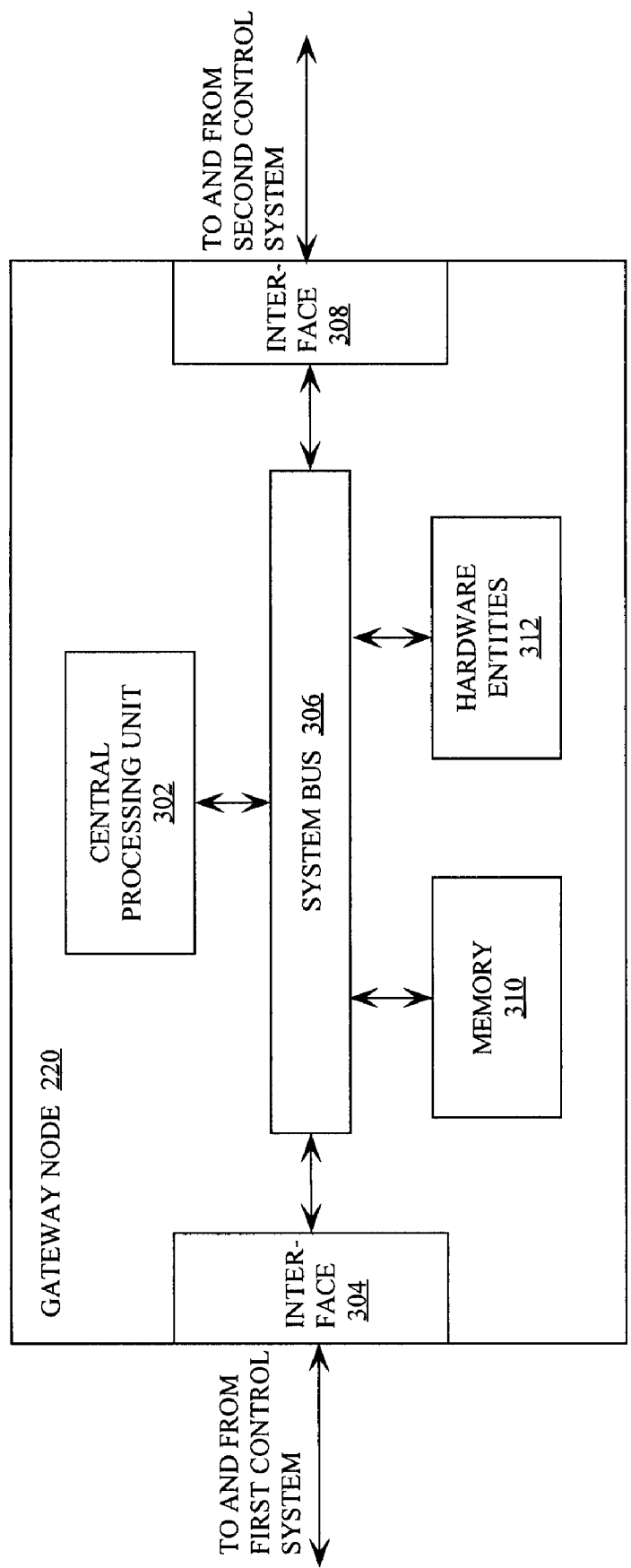
FIG. 3 is a more detailed block diagram of the gateway node shown in FIG. 2.

Referring now to FIG. 3, there is provided a more detailed block diagram of the gateway node 220. As shown in FIG. 3, the gateway node 220 is comprised of system interfaces 304, 308, a central processing unit 302, a system bus 306, a memory 310 connected to and accessible by other portions of the gateway node 220 through the system bus 306, and hardware entities 312 connected to the system bus 306. At least some of the hardware entities 312 perform actions involving access to and use of the memory 310, which may be for example a random access memory (RAM), a disk driver, and/or a compact disc read only memory (CD-ROM).

The hardware entities 312 may include microprocessors, application specific integrated circuits (ASICs), and other hardware. The hardware entities 312 may include a microprocessor programmed for communicating with control systems, such as FICS 202 and SICS 226. More particularly, the hardware entities 312 may include a microprocessor programmed for accessing the memory device 206 of the FICS 202, retrieving data from the memory device 206, and storing data in the memory device 206. The microprocessor may also be programmed for retrieving the CSSDF 212 from the memory device 206 of the FICS 202, process the CSSDF 212 to place the same in a form compatible with the SICS 226, and use the process CSSDF 212 to deny (or block) or allow process parameter $PP_1, PP_2, \ldots, PP_N$ manipulations by a user of the SICS 226.

Figure 4:
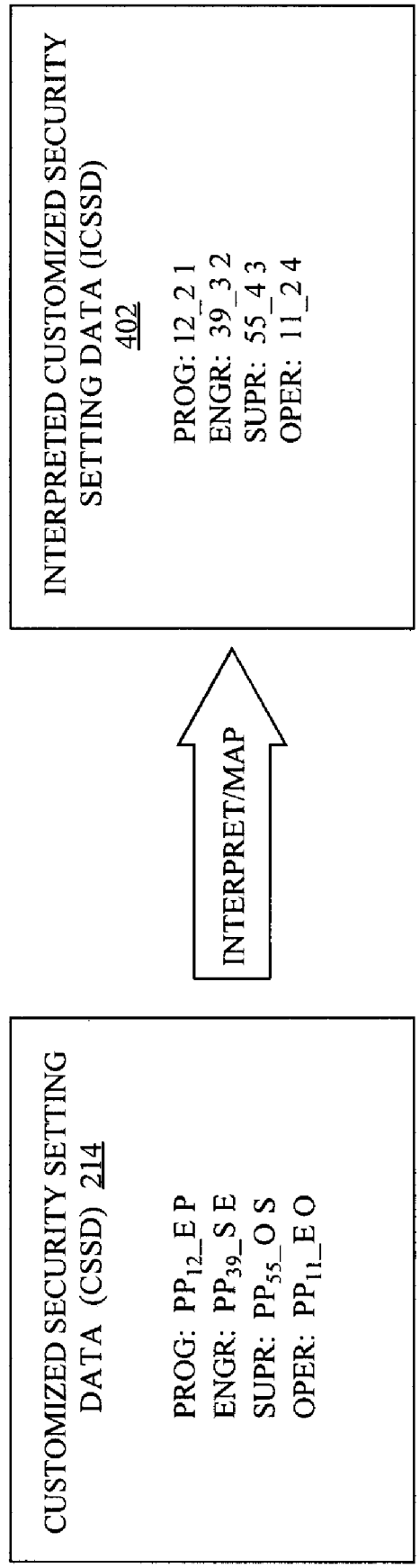
FIG. 4 is a schematic illustration of the customized security setting data interpretation performed by the gateway node of FIGS. 2 and 3.

Referring now to FIG. 4, there is provided a flow diagram of the process for placing the CSSDF 212 in a form compatible with the SICS 226. As shown in FIG. 4, the process generally involves modifying (or interpreting) the data contained in the CSSDF 212 from a format compatible with FICS 202 to a format compatible with SICS 226. For example, it is assumed that the FICS 202 employs a character communications format and the SICS 226 employs a numerical communications format. In such a scenario, if the data 214 contained in the CSSDF 212 includes information $PP_{12}\_E\ P$ indicating that a program access level (PROG) is allowed to manipulate a process parameter $PP_{12}$, then the hardware entities 312 can perform actions to modify (or map) the character expression $PP_{12}\_E\ P$ to the numerical expression 12_2 1. Similarly, the hardware entities 312 can perform actions to modify (or map) each of the character expression $PP_{39}\_S\ E$ for an engineer access level (ENG) to the numerical expression 39_3 2. Likewise, the hardware entities 312 can perform actions to modify (or map) the character expression $PP_{55}\_O\ S$ for a supervisor access level (SUPR) to the numerical expressions 55_4 3, and so on. After completing the interpretation operations, the hardware entities 312 can store the interpreted customized security setting data (ICSSD) 402 in the memory device 310 of FIG. 3. The invention is not limited in this regard.

For example, each of the control systems 202, 226 can employ any communications format selected in accordance with a particular control system application. Furthermore, a look-up table operation can also be employed for converting the data contained in CSSDF 212 from a format compatible with the FICS 202 to a format compatible with SICS 226. Look-up table operations are well known to those having ordinary skill in the art, and therefore will not be described herein.

Referring again to FIG. 3, the system interface 304 allows the gateway node 220 to communicate directly with the FICS 202. However, embodiments of the invention are not limited in this regard. For example, the system interface 304 can alternatively allow the gateway node 220 to communicate indirectly with the FICS 202. In such a scenario, the gateway node 220 communicates with the FICS 202 through a network (not shown). The network (not shown) can be a wireless network such as a local area network, a wide area network, or a personal area network. Similarly, the system interface 308 allows the gateway node 220 to communicate directly with the SICS 226. The invention is not limited in this regard. For example, the system interface 308 can allow the gateway node 220 to communicate indirectly with the SICS 226 through a network (not shown).

Figure 5:
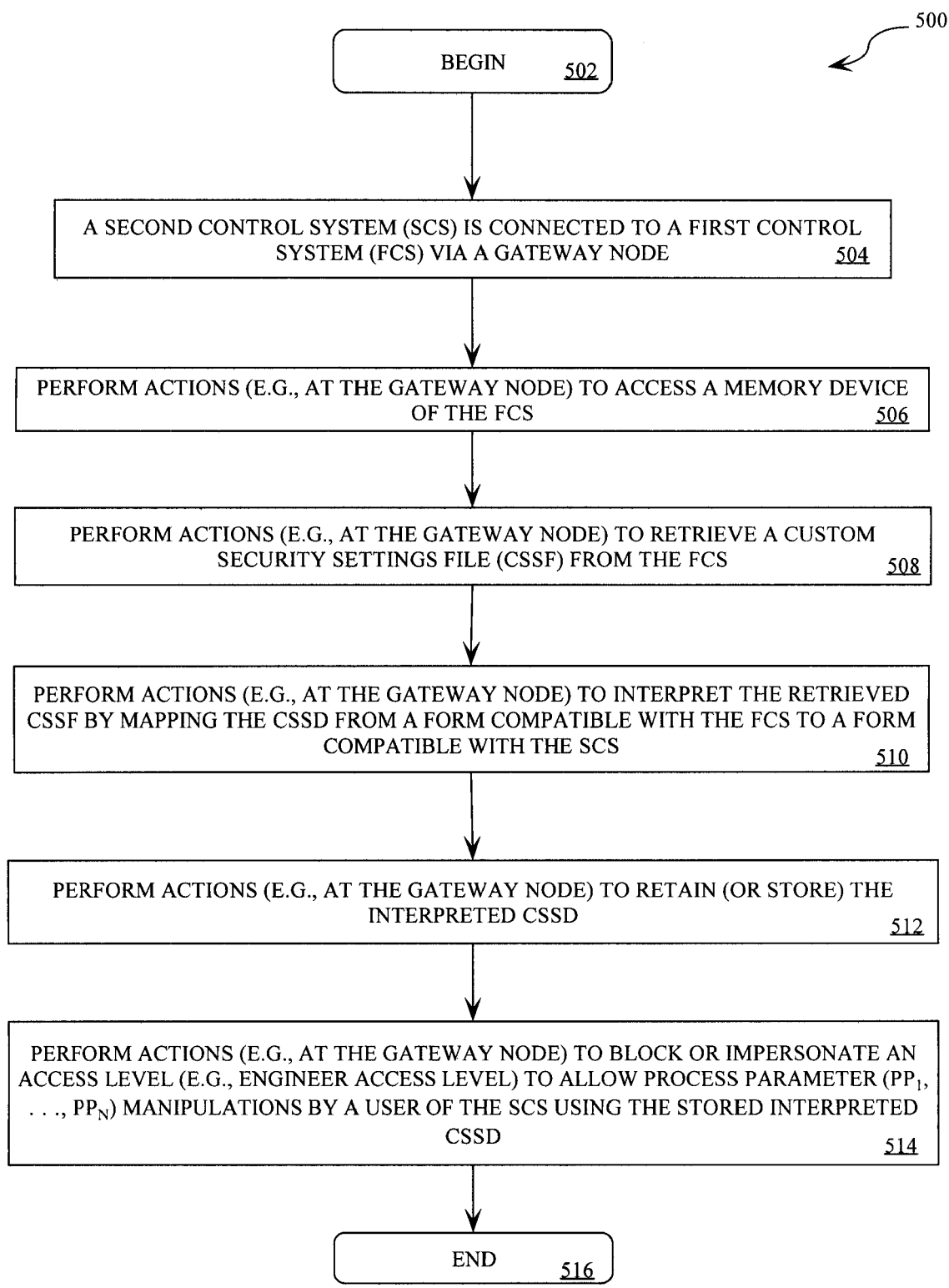
FIG. 5 is a flow diagram of method for synchronizing customized security settings of two (2) computing systems.

The following FIG. 5 and accompanying text illustrate a method 500 for synchronizing (or coordinating) custom security settings between control systems according to embodiments of the invention. It should be appreciated, however, that the method disclosed herein is provided for purposes of illustration only and that the present invention is not limited solely to the method shown.

Referring now to FIG. 5, the method 500 begins at step 502 and continues with step 504. In step 504, a second control system (e.g., the SICS 226 of FIG. 2) is connected to a first control system (e.g., the FICS 202 of FIG. 2) via a gateway node (e.g., the gateway node 220 of FIG. 2). Notably, the gateway node is also referred to herein as an intermediary processing device. Thereafter, the method 500 continues with step 506. In step 506, the gateway node (e.g., gateway node 220 of FIG. 2) performs actions to access data stored in a memory device (e.g., memory device 206) of the first control system (e.g., FICS 202). Such actions are well known to those having ordinary skill in the art, and therefore will not be described herein. Subsequently, the gateway node (e.g., the gateway node 220 of FIG. 2) performs actions to retrieve a custom security settings data file (e.g., the CSSDF 212) from the memory device (e.g., memory device 206 of FIG. 2) of the first control system (e.g., the FICS 202). Such actions can generally include, but are not limited to, communicating a message including a read command for reading a data file from the memory device. Read commands are well known to those having ordinary skill in the art, and therefore will not be described herein.

It should be noted that the actions performed in steps 506 and 508 can be performed in accordance with a gateway node initialization process. In such a scenario, the gateway node (e.g., the gateway node 220 of FIG. 2) can automatically perform said actions upon being powered on or initialized. The term "initialize" as used herein refers to a process for starting up a computing system or running an initialization software application for preparing the computing system for performing certain operations.

Referring again to FIG. 5, step 510 is performed after the custom security settings data file (e.g., the CSSDF 212) has been retrieved in step 508. In step 510, the gateway node (e.g., the gateway node 220 of FIG. 2) interprets the retrieved custom security settings data file (e.g., the CSSDF 212). This interpretation generally involves modifying (or mapping) the data contained in the custom security settings data file (e.g., the CSSDF 212) from a format compatible with the first control system (e.g., the FICS 202) to a format compatible with the second control system (e.g., the SICS 226 of FIG. 2). This modifying (or mapping) is described in detail above in relation to FIG. 4. Thereafter, step 512 is performed where the modified (or mapped) custom security settings data file is retained or stored in a memory device (e.g., memory device 310 of FIG. 3) of the gateway node (e.g., the gateway node 220 of FIG. 2).

In step 514, the gateway node (e.g., the gateway node 220 of FIG. 2) performs actions to either deny (or block) or impersonate an access level (e.g., engineer) to allow process parameter (e.g., $PP_1$, $PP_2$, ..., $PP_N$) manipulations by a user (e.g. an operator) of the second control system (e.g., the SICS 226 of FIG. 2). The actions to block or allow process parameter manipulations will be described below in relation to FIG. 6. In step 516, the method 500 ends.

The term "impersonate" as used herein refers to a process of using an access level other than the access level of the user logged into the second control system. For example, if a user having an operator status is logged into the second control system and wants to change a process parameter that can only be changed by an engineer (e.g., $PP_{11}$), then the gateway node (e.g., the gateway node 220 of FIG. 2) generates a message using the ENGR access level instead of the OPER access level. The gateway node (e.g., the gateway node 220 of FIG. 2) can then communicate the message to the first control system to allow the process parameter (e.g., $PP_{11}$) manipulation by the operator. Still, the invention is not limited in this regard.

Figure 6:
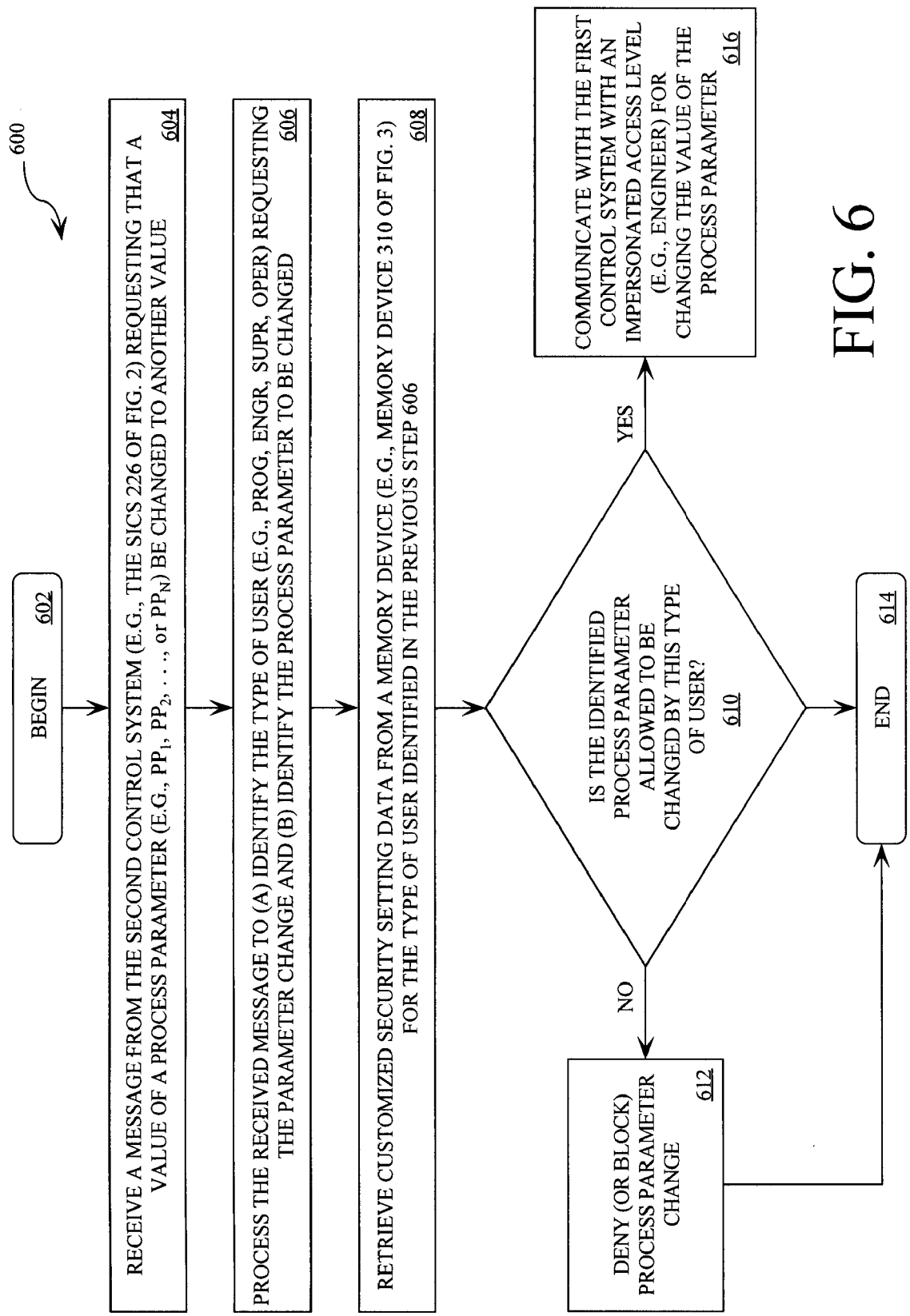
FIG. 6 is a flow diagram of a method for blocking or impersonating an engineer access level to allow process parameter manipulations.

Referring now to FIG. 6, there is provided a flow diagram of a method 600 according to an embodiment of the invention for blocking or impersonating an access level (e.g., engineer) to allow process parameter manipulations. Method 600 can be performed in step 514 of FIG. 5. As shown in FIG. 6, the method 600 begins at step 602 and continues to step 604. In step 604, the gateway node (e.g., the gateway node 220 of FIG. 2) receives a message from the second control system (e.g., the SICS 226 of FIG. 2) requesting that a value of a process parameter (e.g., $PP_1$, $PP_2$, ..., or $PP_N$) be changed to another value. This message can generally include information identifying the type of user (or access level) that is logged into the system. For example, if an operator John Doe is logged into the system, then the message can include information indicating that an OPER access level is requesting a process parameter change.

Thereafter, the method 600 continues with step 606. In step 606, the received message is processed to (a) identify the type of user (e.g., PROG, ENGR, SUPR, OPER) requesting the process parameter change and (b) identify the process parameter (e.g., $PP_1$, $PP_2$, ..., or $PP_N$) that is being requested to be changed or viewed. Subsequently, step 608 is performed where the gateway node (e.g., the gateway node 220 of FIG. 2) accesses an internal memory device (e.g., memory device 310 of FIG. 3) and retrieves customized security setting data 402 from the same for the type of user previously identified in step 606.

In step 610, a determination is made at the gateway node (e.g., the gateway node 220 of FIG. 2). More particularly, it is determined whether the identified process parameter (e.g., $PP_1$, $PP_2$, ..., or $PP_N$) is allowed to be changed (or manipulated) by the type of user previously identified in step 606 based on the retrieved customized security setting data. This determination can be provided by directly comparing the identified process parameter for the identified user type (or access level) to the retrieved customized security setting data. This direct comparison can comprise cross-referencing data between the identified process parameter for the identified user type (or access level) and the retrieved customized security setting data.

It should be noted that parameters and user types in the SICS 226 are presented to the gateway node 220 generally in an internal numerical form as opposed to an external alphabetic name. The interpreted customized security setting data (ICSSD 402 shown in FIG. 4) in the SICS 226 can be saved in a table that is keyed by an internal numeric parameter handle. The table entry at a particular parameter key can have the numeric handle of the customized security setting for a particular parameter. For example, if a parameter is presented to the gateway node 220 for storage to the FICS 202 by the SICS 226, then the gateway node 220 can perform a lookup operation using the incoming parameter's numeric handle to search in the ICSSD 402 table. If no entry is found during the lookup operation, then the parameter request does not have a custom security setting. In such a scenario, the parameter can be passed to the FICS 202 without further intervention. Alternatively, if an entry is found during the lookup operation, then the entry at that location in the ICSSD 402 table contains a custom security setting for the parameter. If the custom security setting is more restrictive then the user type presented to the gateway node 220, then the request can be rejected with a security error indication. If the custom security setting is equal to or less restrictive than the user type presented to the gateway node 220, then the gateway node 220 impersonates an access level (e.g., ENGR). In such a scenario, the parameter can be passed to the SICS 226.

If it is determined that the identified process parameter (e.g., $PP_1$, $PP_2$, ..., or $PP_N$) is not allowed to be changed (or manipulated) by the type of user previously identified in step 606 [610:NO], then step 612 is performed. In step 612, the gateway node (e.g., the gateway node 220 of FIG. 2) denies (or blocks) the process parameter change. Step 612 can involve communicating a message to the second control system (e.g., the SICS 226 of FIG. 2). The message can include information indicating the process parameter (e.g., $PP_1$, $PP_2$, ..., or $PP_N$) change is not allowed (or blocked). Upon receipt of the message, the second control system (e.g., the SICS 226 of FIG. 2) may process the same and display a text message (or other indicator) to the user indicating that the process parameter change was not allowed (or blocked). Subsequent to step 612, step 614 is performed where the method 600 ends.

Alternatively, if it is determined that the type of user previously identified is allowed to change (or manipulate) the identified process parameter (e.g., $PP_1$, $PP_2$, ..., or $PP_N$) [610:YES], then step 616 is performed. In step 616, the gateway node (e.g., the gateway node 220 of FIG. 2) communicates with the first control system (e.g., the FICS 202) with an impersonated access level (e.g., engineer) for changing the value of the identified process parameter (e.g., $PP_1$, $PP_2$, ..., or $PP_N$) Step 616 can generally involve communicating a message from the gateway node (e.g., the gateway node 220 of FIG. 2) to the first control system (e.g., the FICS 202). The message may include (a) a command to change the value of the identified process parameter (e.g., $PP_1$, $PP_2$, ..., or $PP_N$) to a new value specified by the user and/or (b) a command to obtain information about the identified process parameter (e.g., $PP_1$, $PP_2$, ..., or $PP_N$). Upon completing step 616, step 614 is performed where the method 600 ends.

In light of the forgoing description of a method for synchronizing (or coordinating) custom security settings of control systems according to embodiments of the invention, it should be recognized that the present invention can be realized in hardware, software, or a combination of hardware and software. Any kind of computer system, or other apparatus adapted for carrying out the methods described herein, is generally suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A method for communicating data between a first control system and a second control system, said first control system operable for controlling a first process having first security data in a first data security format for limiting access to said first process, comprising the steps of:

modifying, by a computing device, said first security data retrieved from a memory device associated with said first control system from being in said first data security format into modified security data in a modified security format, said modified security format compatible with said second control system;

subsequent to said modifying step, receiving a request from a user of said second control system, said request including a user type and for permission to change a value of a process parameter associated with said first process;

retrieving a custom security settings data file from said first control system, wherein said custom security settings data file contains said first security data operable for identifying a plurality of said process parameters that a plurality of said user types are allowed or not allowed to change;

referencing said user type and said process parameter to said modified security data and determining whether said value of said process parameter is allowed to be changed by said user type;

based on results of said referencing, blocking or allowing said request for permission to change said value of said process parameter, wherein if it is determined that said value of said process parameter is allowed to be changed by said user type, communicating with said first control system utilizing an impersonated access level that raises an access level for said user beyond an access level based on said user type of said user to enable changing said value of said process parameter; and wherein if it is determined that said value of said process parameter is allowed to be changed by said user type, providing said user of said second control system with a limited access right, said limited access right to enable only said changing said value of said process parameter.

2. The method according to claim 1, wherein said plurality of user types include a program user type, an engineer user type, a supervisor user type, or an operator user type.

3. The method according to claim 1, further comprising the step of retaining said modified security data for subsequent use in determining whether to allow a value of said process parameter to be changed by said user.

4. The method according to claim 1, further comprising the step of writing said value of said process parameter into said memory device of said first control system.

5. The method according to claim 1, further comprising the step of denying said request for permission to change a value of said process parameter if it is determined that said process parameter is not allowed to be changed by said user type.

6. The method according to claim 1, wherein said first and second computing systems comprise industrial plant control systems.

7. A control system, comprising:
a first control system including a first processor and a first computer memory storing computer executable instructions that when executed by the first processor cause the processor to perform the step of controlling a first process having first security data in a first data security format for limiting access to said first process;
a second control system including a second processor and a second computer memory storing computer executable instructions that when executed by the
second processor cause the processor to perform the step of enabling a user request including a user type and a request for permission to change a value of a process parameter associated with said first process; and
an intermediary processing device coupled between said first and second control systems, said intermediary processing device including a third processor and a third computer memory storing computer executable instructions that when executed by the third processor cause the processor to perform the steps of:
modifying said first security data from being in said first data security format into modified security data in a modified security format compatible with said second control system,
receiving said user request from a user of said second control system,
retrieving a custom security settings data file from said first control system, wherein said custom security settings data file contains said first security data identifying a plurality of said process parameters that a plurality of said user types are allowed or not allowed to change,
referencing said user type and said process parameter to said modified security data,
blocking or allowing said user request for permission to change said value of said process parameter based on results of said referencing,
if it is determined that said value of said process parameter is allowed to be changed by said user type, communicating with said first control system utilizing an impersonated access level that raises an access level for said user beyond an access level based on said user type of said user to enable changing said value of said process parameter, and
if it is determined that said value of said process parameter is allowed to be changed by said user type, providing said user of said second control system with a limited access right, said limited access right to enable only said changing said value of said process parameter.

8. The control system according to claim 7, wherein said plurality of user types include a program user type, an engineer user type, a supervisor user type, or an operator user type.

9. The control system according to claim 7, wherein said intermediary processing device is further configured for retaining said modified security data for subsequent use in determining whether to allow a value of said process parameter to be changed by said user.

10. The control system according to claim 7, wherein said intermediary processing device is further configured for writing said value of said process parameter into a memory device of said first control system.

11. The control system according to claim 7, wherein said intermediary processing device is further configured for denying said request to change a value of said process parameter if it is determined that said process parameter is not allowed to be changed by said user.

12. The control system according to claim 7, wherein said first and second control systems comprise industrial plant control systems.

13. A method for communicating data between distributed control systems (DCSs), comprising:
providing a first DCS and a second DCS both including application specific modules connected to each other, industrial equipment, and user interfaces connected via a local control network, wherein said first DCS is operable for controlling a first process having first security data in a first data security format stored on a memory device associated with said first DCS for limiting access to said first industrial process;
modifying, by a computing device, said first security data retrieved from said memory device from being in said first data security format into modified security data in a modified security format, said modified security format compatible with said second DCS;
subsequent to said modifying step, receiving a request from a user of said second DCS, said request including a user type and for permission to change a value of a process parameter associated with said first process;
retrieving a custom security settings data file from said first DCS, wherein said custom security settings data file contains said first security data operable for identifying a plurality of said process parameters that a plurality of said user types are allowed or not allowed to change;

referencing said user type and said process parameter to said modified security data and determining whether said value of said process parameter is allowed to be changed by said user type, and based on results of said referencing, blocking or allowing said request for permission to change said value of said process parameter, wherein if it is determined that said value of said process parameter is allowed to be changed by said user type, communicating with said first DCS utilizing an impersonated access level that raises an access level for said user beyond an access level based on said user type of said user to enable changing said value of said process parameter, and wherein if it is determined that said value of said process parameter is allowed to be changed by said user type, providing said user of said second control system with a limited access right, said limited access right to enable only said changing said value of said process parameter.

* * * * *